(12) United States Patent
Wang et al.

(10) Patent No.: US 10,964,122 B2
(45) Date of Patent: Mar. 30, 2021

(54) SNAPPING VIRTUAL OBJECT TO TARGET SURFACE

(71) Applicant: Microsoft Technology Licensing, LLC, Redmond, WA (US)

(72) Inventors: Jia Wang, Issaquah, WA (US); Joshua B. Eiten, Seattle, WA (US)

(73) Assignee: MICROSOFT TECHNOLOGY LICENSING, LLC, Redmond, WA (US)

(*) Notice: Subject to any disclaimer, the term of this patent is extended or adjusted under 35 U.S.C. 154(b) by 13 days.

(21) Appl. No.: 16/294,746

(22) Filed: Mar. 6, 2019

(65) Prior Publication Data

US 2020/0286299 A1   Sep. 10, 2020

(51) Int. Cl.
*G06T 19/20* (2011.01)

(52) U.S. Cl.
CPC .......... *G06T 19/20* (2013.01); *G06T 2210/12* (2013.01); *G06T 2219/2016* (2013.01)

(58) Field of Classification Search
None
See application file for complete search history.

(56) References Cited

U.S. PATENT DOCUMENTS

| | | | |
|---|---|---|---|
| 10,061,496 B2 | 8/2018 | Stone | |
| 2014/0333666 A1* | 11/2014 | Poulos | G06F 3/147 345/633 |
| 2016/0110077 A1* | 4/2016 | Stone | G06F 3/0488 715/769 |
| 2016/0179336 A1* | 6/2016 | Ambrus | G06F 3/013 715/768 |
| 2016/0189426 A1 | 6/2016 | Thomas et al. | |

OTHER PUBLICATIONS

"International Search Report and Written Opinion Issued in PCT Application No. PCT/US20/015518", dated May 13, 2020, 11 Pages.

* cited by examiner

*Primary Examiner* — Michelle Chin
(74) *Attorney, Agent, or Firm* — Workman Nydegger

(57) ABSTRACT

Facilitating a virtual object contacting (or snapping to) a target surface (such as a virtual surface in a virtual reality environment, or a real surface in an augmented reality environment). A computing system detects a user-selection of a virtual object, and that the virtual object has moved proximate to a target surface. While the virtual object remains proximate to the target surface, if the computing system detects a user-initiated snapping instruction, the computing system snaps the virtual object to the target surface. Potentially, after the virtual object is snapped to the target surface, the user may continue to manipulate (e.g., resize, reproportion, copy, slide, rotate, and so forth) that virtual object while maintaining the virtual object in contact with the target surface.

21 Claims, 15 Drawing Sheets

SNAPPING VIRTUAL OBJECT TO TARGET SURFACE

BACKGROUND

Computing systems often offer an interactive user experience. Virtual reality is a computer-generated experience in which a user interacts with a simulated environment. In virtual reality, a user may perform various physical activities (e.g., reaching, grabbing, turning, gazing, pointing, swiping, and so forth) and the simulated environment responds in an intuitive way to the user. Such simulated environments might represent an environment similar to that found in the real world, and/or have fantastical elements. Augmented reality is an experience in which the user interacts with a mixed environment in which simulated objects are layered upon a real environment. In augmented reality, a user may perform various physical activities to interact with the real environment as well as with simulated objects layered on that real environment.

Conventional virtual reality may be used to create simulated environments. For instance, a user may actually interface with a simulated environment to add onto that environment. As an example, one might build a simulated snowman in a simulated evergreen forest. To facilitate adding objects to the simulated environment, some technologies might snap a simulated object onto a simulated surface. Snapping involves automatically moving the simulated object so as to contact or abut the simulated surface. This prevents the user from having to precisely manipulate the simulated object so that it is in precise contact with the simulated surface. Accordingly, such snapping saves the user considerable time in building or interfacing with the simulated environment.

The subject matter claimed herein is not limited to embodiments that solve any disadvantages or that operate only in environments such as those described above. Rather, this background is only provided to illustrate one exemplary technology area where some embodiments described herein may be practiced.

BRIEF SUMMARY

At least some embodiments described herein relate to facilitating a virtual object contacting (or snapping to) a target surface. For instance, the target surface might be a virtual surface in a virtual reality environment, or a real surface in an augmented reality environment. A computing system detects a user-selection of a virtual object, and that the virtual object has moved proximate to a target surface. While the virtual object remains proximate to the target surface, if the computing system detects a user-initiated snapping instruction, the computing system snaps the virtual object to the target surface.

This avoids the user having to cumbersomely place and maneuver the virtual object so that it is in precise contact with the target surface. Furthermore, because snapping does not occur without a user instruction, inadvertent snapping is avoided. The net effect is a much more efficient way to cause a virtual object to become in contact with a target surface. Because such is a repeated task when building virtual and augmented reality environments, this results in much more efficient construction of such environments, and potentially much richer environments for a given amount of effort.

In accordance with some embodiments described herein, after the virtual object is snapped to the target surface, the user may continue to manipulate (e.g., resize, reproportion, copy, slide, rotate, and so forth) that virtual object while maintaining the virtual object in contact with the target surface. Thus, precise positioning and refinement of the virtual object remains possible without having to unsnap the virtual object from the target surface.

This summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

In order to describe the manner in which the above-recited and other advantages and features of the invention can be obtained, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings in which:

FIG. 2 illustrates an example user interface that includes a virtual object and a target surface;

FIG. 3 illustrates an example user interface that is the same as the user interface of FIG. 2, except that the user has caused a virtual controller to be shown;

FIG. 4 illustrates an example user interface that is the same as the user interface of FIG. 3, except that the user has used the virtual controller to move the virtual object so that it is in closer proximity to the target surface;

FIG. 5 illustrates the virtual object inside of a bounding box that is used for detecting proximity to a target surface, and determining how the virtual object should be snapped to the target surface;

FIG. 6 illustrates a user interface that is similar to the user interface of FIG. 4, except after the user has selected a snap control on the virtual controller;

FIG. 7 illustrates a user interface that is similar to the user interface of FIG. 6, except that now the user has selected a rotation control on the virtual controller;

FIG. 8 is a user interface that is similar to the user interface of FIG. 7, except that now, the user has caused the rotation of the target surface to rotationally snap to orientation lines of the target surface;

FIG. 9 is a user interface that is similar to the user interface of FIG. 8, except that the rotation controls have now disappeared, and instead the user is using a resize control to resize the virtual object while it is still snapped to the target surface;

FIG. 10 shows a user interface in which the user uses a reproportion control to change the proportions (stretch or compress) the virtual object while it is still snapped to the target surface;

FIG. 11 shows a user interface in which the user uses a copy control to make a copy of the virtual object which is also snapped to the target surface;

FIG. 13 shows the user interface prior to snapping the virtual object to the surface of the sphere;

FIG. 14 shows the user interface after snapping the virtual object to the surface of the sphere.

DETAILED DESCRIPTION

At least some embodiments described herein relate to facilitating a virtual object contacting (or snapping to) a target surface. For instance, the target surface might be a virtual surface in a virtual reality environment, or a real surface in an augmented reality environment. A computing system detects a user-selection of a virtual object, and that the virtual object has moved proximate to a target surface. While the virtual object remains proximate to the target surface, if the computing system detects a user-initiated snapping instruction, the computing system snaps the virtual object to the target surface.

This avoids the user having to cumbersomely place and maneuver the virtual object so that it is in precise contact with the target surface. Furthermore, because snapping does not occur without a user instruction, inadvertent snapping is avoided. The net effect is a much more efficient way to cause a virtual object to become in contact with a target surface. Because such is a repeated task when building virtual and augmented reality environments, this results in much more efficient construction of such environments, and potentially much richer environments for a given amount of effort.

In accordance with some embodiments described herein, after the virtual object is snapped to the target surface, the user may continue to manipulate (e.g., resize, reproportion, copy, slide, rotate, and so forth) that virtual object while maintaining the virtual object in contact with the target surface. Thus, precise positioning and refinement of the virtual object remains possible without having to unsnap the virtual object from the target surface.

Figure 1:
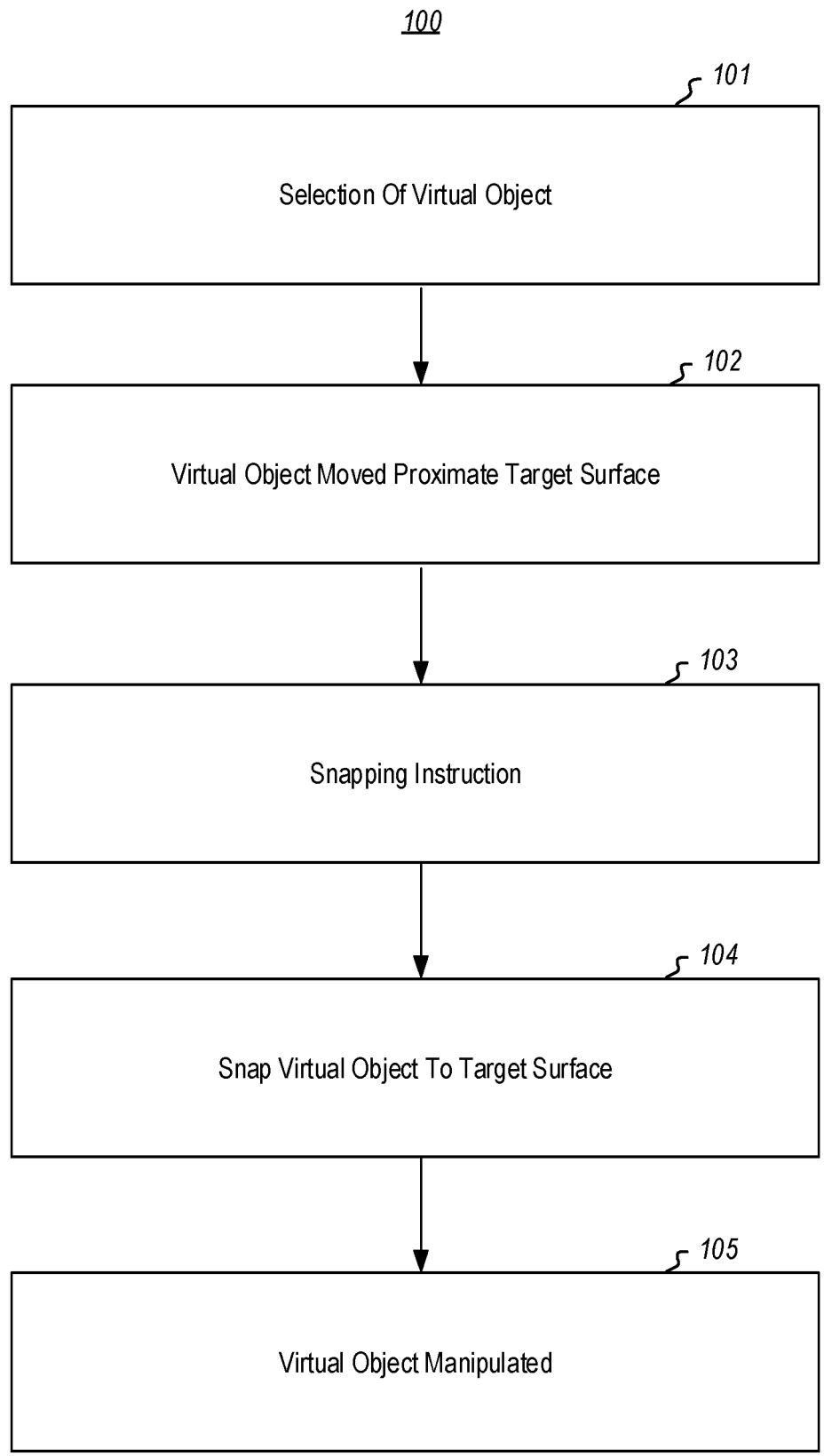
FIG. 1 illustrates a flowchart of a method for facilitating a virtual object contacting a target surface, in accordance with the principles described herein.

FIG. 1 illustrates a flowchart of a method 100 for facilitating a virtual object contacting a target surface, in accordance with the principles described herein. The method 100 may be performed by a computing system, such as the computing system 1500 described below with respect to FIG. 15. For instance, the method 100 may be performed in response to one or more processors 1502 of the computing system 1500 executing one or more computer-executable instructions that are on one or more computer-readable media.

Briefly stated, the method 100 includes detecting a user-selection of the virtual object (act 101), and detecting that the virtual object has moved proximate a target surface (act 102). Furthermore, while the virtual object remains proximate the target surface, the method 100 includes detecting a user-initiated snapping instruction (act 103). In response to the user-initiated snapping instruction (act 103), the virtual object is snapped to the target surface (act 104). Potentially, after the virtual object is snapped to the target surface (act 104), and even absent a user instruct to unsnap the virtual object from the target surface, the virtual object may still be manipulated (act 105) with a constraint that the virtual object remains in contact with the target surface.

In FIGS. 2 through 11, there is shown a specific example in which the virtual object being moved and manipulated is in the form of a dinosaur, and the target surface is a square. That said, the virtual object may be any virtual object, whether designed to appear as a real element, or whether a fantastical element. In this description, the term "virtual" when used to modify another term (such as an "object" or "controller") is used to symbolize that the object being modified is displayed in a virtual reality or augmented reality environment.

The target surface may take any form, whether as simple as a square, or whether complex, such as an alien landscape. The method 100 of FIG. 1 will be described with frequent reference to the specific example of FIGS. 2 through 14. The example of FIGS. 2 through 14 may represent virtual reality and augmented reality user interfaces, such as might be offered by the computing system 1500 described below with respect to FIG. 15.

Figure 2:
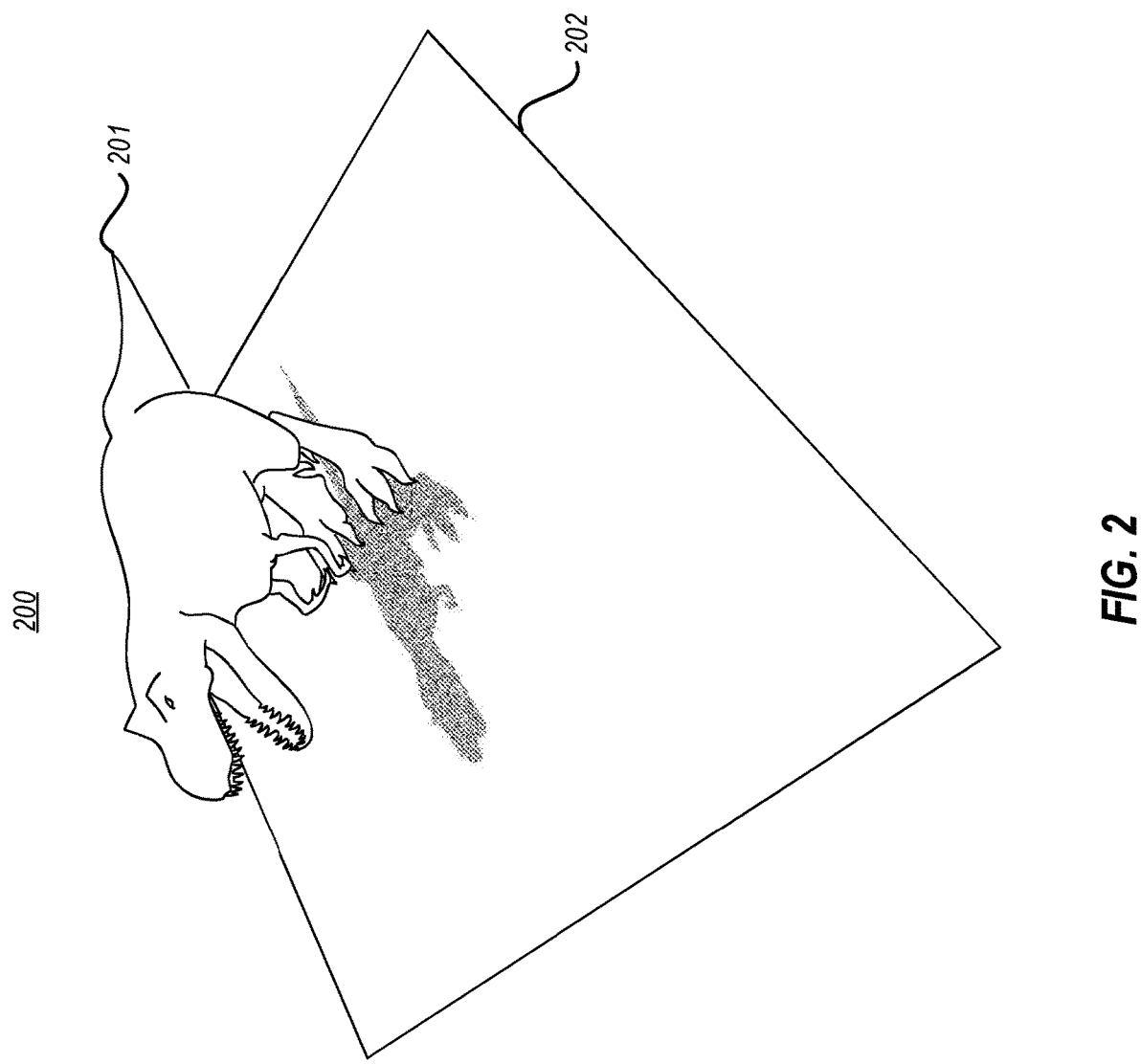
FIGS. 2 through 11 illustrate virtual or augmented reality user interfaces in which a user interfaces with a virtual object and target surface, and in this example, in which the virtual object is a representation of a dinosaur, and the target surface is a square.

The specific example is first introduced with respect to FIG. 2. FIG. 2 illustrates an example user interface 200 (e.g., a virtual reality or augmented reality user interface) that includes a virtual object 201 and a target surface 202. The target surface 202 might be a virtual surface if the user interface 200 shows a virtual reality environment, or may be a real surface if the user interface 200 shows an augmented reality environment. As apparent from the simulated shadow of the virtual object 201, the virtual object 201 is not yet in contact with the target surface 202 in FIG. 2.

Figure 3:
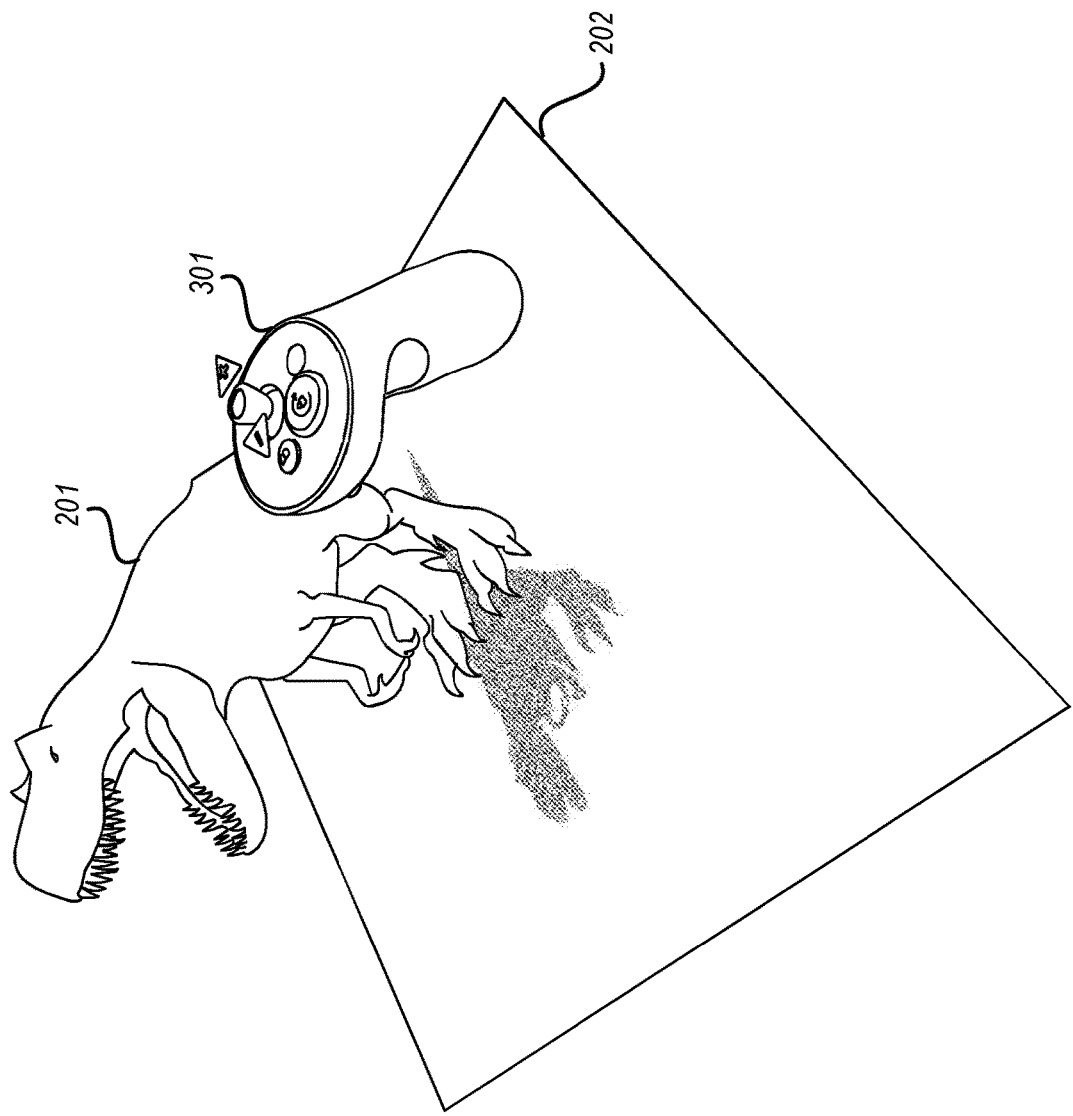

FIG. 3 illustrates an example user interface 300 that is the same as the user interface 200 of FIG. 2, except that the user has caused a virtual controller 301 to be shown. Like many of the illustrated user interfaces, the angle of perspective is slightly adjusted so as to get a better view of the elements that are newly introduced in that user interface. The user may interface with the virtual controller 301 to perform movement and manipulations of the virtual object 201. For instance, the user may interact with the virtual controller 301 in order to issue user-selection of the virtual object 201 (associated with act 101 of FIG. 1), user-movement of the virtual object 201 (associated with act 102 of FIG. 1), user-initiated snapping (associated with act 103 of FIG. 1), and post-snapping manipulation of the virtual object 201 (associated with act 105 of FIG. 1). For now, in FIG. 3, the user has selected the virtual object 201, which represents an example of act 101 of FIG. 1.

Figure 4:
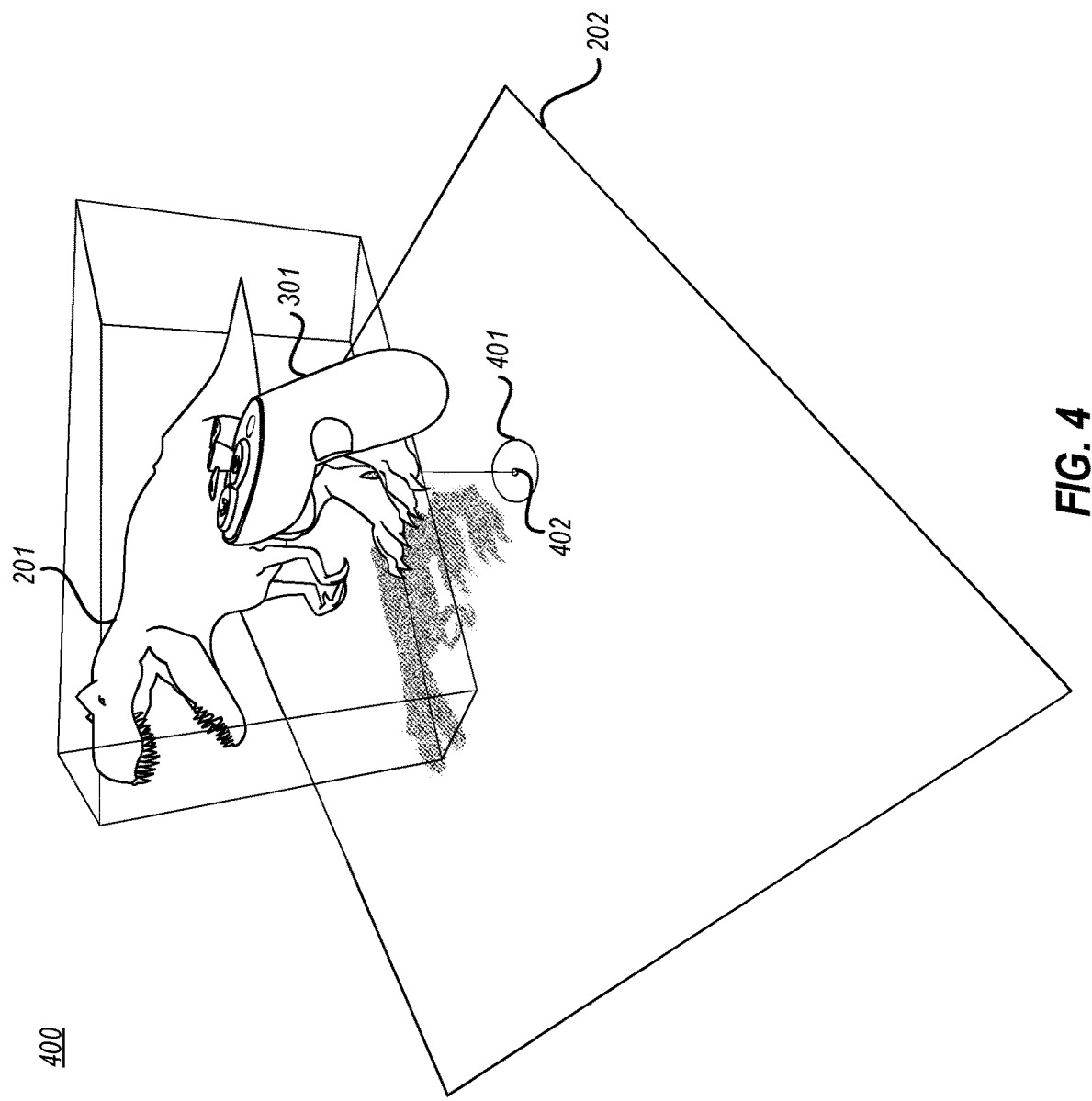

FIG. 4 illustrates an example user interface 400 that is the same as the user interface 300 of FIG. 3, except that the user has used the virtual controller 301 to move the virtual object 201 so that it is in closer proximity to the target surface 202 (an example of act 102 of FIG. 1). Note that because the virtual object 201 has moved proximate the target surface 202, the target surface 202 is visually emphasized to the user. In this case, there is a point 402 surrounded by a circle 401, which appears on the surface. At this point, this description will detail how proximity of the virtual object 201 to the target surface 202 may be detected, as well as how the position of the point 402 may be determined. This is for example purposes only.

Figure 5:
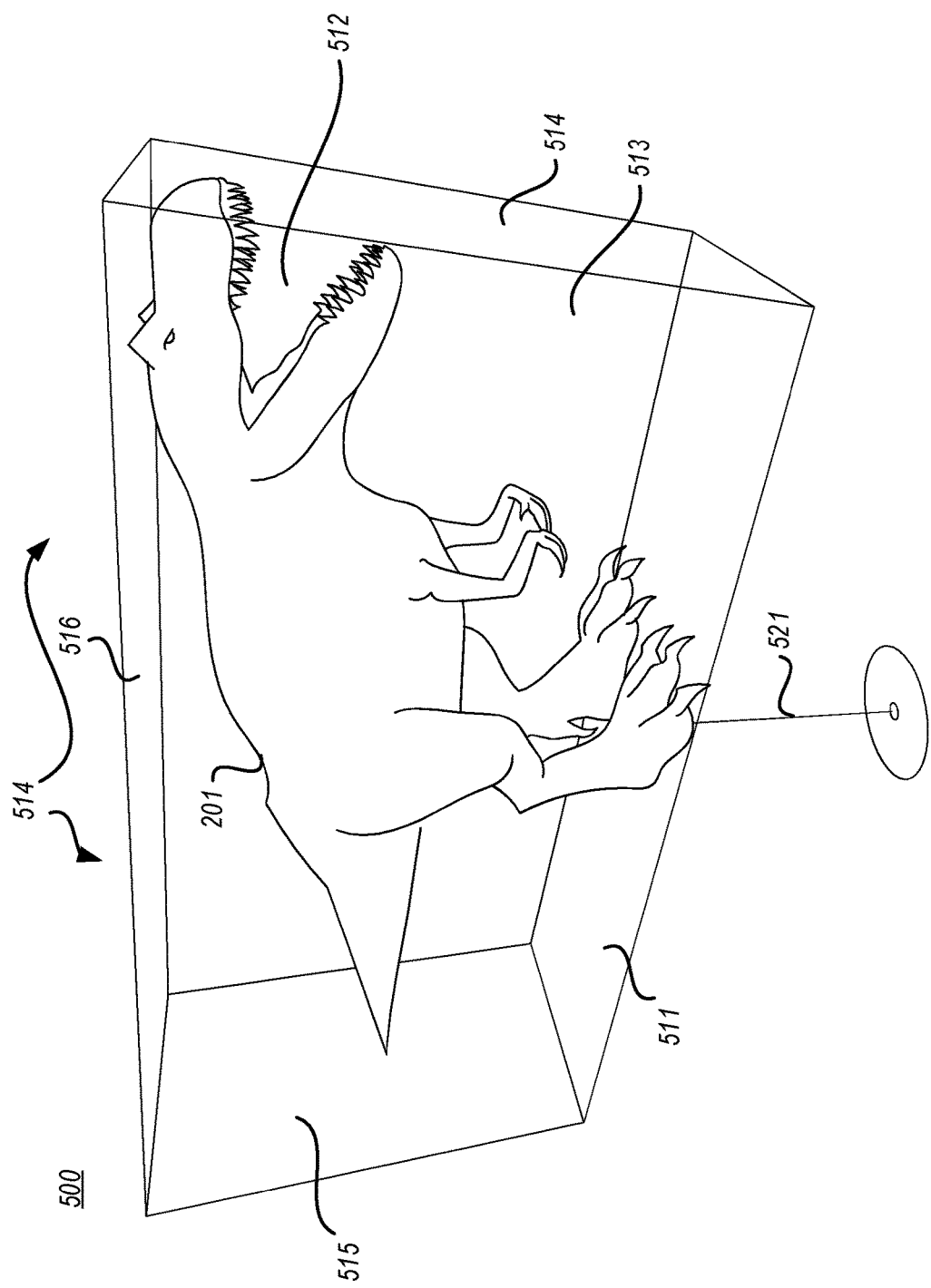

As illustrated in FIG. 5, the virtual object 201 is bounded by bounding volume 501. In this case, the bounding volume 501 is a box having six sides 511 through 516. That said, the bounding volume 501 may have any shape. Other options for a bounding volume include a tetrahedron, a cylinder, a cone, a dodecahedron, the actual shape of the virtual object itself, or any other bounding volume. The number of sides of such a bounding volume will depend on the shape of the bounding volume. However, to reduce calculations associated with defining and moving the bounding volume, a box-shaped bounding volume is straightforward.

In the case of the bounding volume being a box having six sides (as in the case of the bounding volume 501 of FIG. 5), the bounding volume may be defined to have a length, width, and height that approximates the length, width, and height, respectively, of the virtual object 201. The bounding volume 501 moves with the virtual object 201 as the user moves the virtual object 201. In addition, the bounding volume scales with the virtual object 201 as the user reproportions (e.g., stretches or compresses) the virtual object 201.

Although the snapping is not illustrated yet in FIG. 5, when the virtual object 201 snaps to the target surface 202, it is the side (e.g., side 511) most proximate the target surface 202 that snaps to the target surface 202. Snapping of the bounding volume 501 to the target surface 202 also causes the virtual object 201 to snap to the target surface 202. The bounding volume 501 may be invisible or transparent to the user, such that the user can clearly see that the virtual object 201 has snapped to the target surface 202.

In one embodiment, all of the sides of the bounding volume are "qualified sides" meaning that the side is eligible for snapping to the target surface. However, there may be circumstances in which there may be one or more sides of the bounding volume that are not qualified sides, meaning that they are not eligible for snapping to the target surface, even if it is the most proximate side to the target surface. For instance, in the case of a dinosaur, the front side 514, back side 515, and top side 516 of the bounding volume 501 may each be a disqualified side, if it is anticipated that there is no reason to ever have a dinosaur attached to a target surface at its head, nose or tail. The sides of the bounding box that are qualified or disqualified may depending on the nature of the virtual object it bounds. However, in one embodiment, to reduce processing and memory complexity, all sides of a bounding volume may be qualified sides for potentially snapping to a target surface.

In the case of using a bounding volume, in order to detect that the virtual object has moved proximate the target surface, it may be that rays are emitted from the center of the bounding volume, through the center of each side of the bounding volume. These rays might be invisible to the user if there are no sides of the bounding volume that are within a particular distance to a potential target surface within the virtual or augmented reality environment. Rather, the rays may be in-memory constructs used for calculating proximity.

For instance, in the case of the bounding volume being a box-shaped bounding volume 501, there may be six rays that are determined to be emitted from the center of each side. In the case of FIG. 5, the ray 521 is illustrated as emitting from the bottom side 511 of the bounding volume 501. For sides that are not qualified sides, there need be no ray. For each ray, it is determined whether or not that ray intersects a surface within the virtual and augmented reality environment. For any ray that does intersect a surface, it is determined whether or not the length of that ray (from the side to the surface) is within a certain distance. The corresponding side is determined to be proximate the target surface. If there are multiple such rays, the shortest ray may be determined to be the most proximate. In one embodiment, when a ray is shorter that a particular distance (demonstrating proximity), or when it is the shortest of such rays (demonstrating it corresponds to the side that is most proximate to that target surface), the computing system may make the ray visible to the user.

In the case of FIG. 5, ray 521 is the shortest ray (other rays are not illustrated). Referring to FIG. 4, the point 402 illustrates where the shortest ray intersects with the target surface 202. When snapping, the most proximate side of the bounding volume may be snapped to the target surface such that the point where the ray intersects the side is snapped to the point where the ray intersects with the target surface, thus pinning that most proximate side of the bounding volume to the target surface at a precise location.

In one embodiment, there may be multiple rays that emit from each side. For instance, a qualified side might have five rays pass from it, one from the center of the bounding volume through the center of that side, and for each corner of that side, one ray emitting from the corner towards a direction from the center of the bounding volume through the center of the side close to that corner. Thus, for instance, one can then snap a cantilever to a surface that supports that cantilever.

Figure 6:
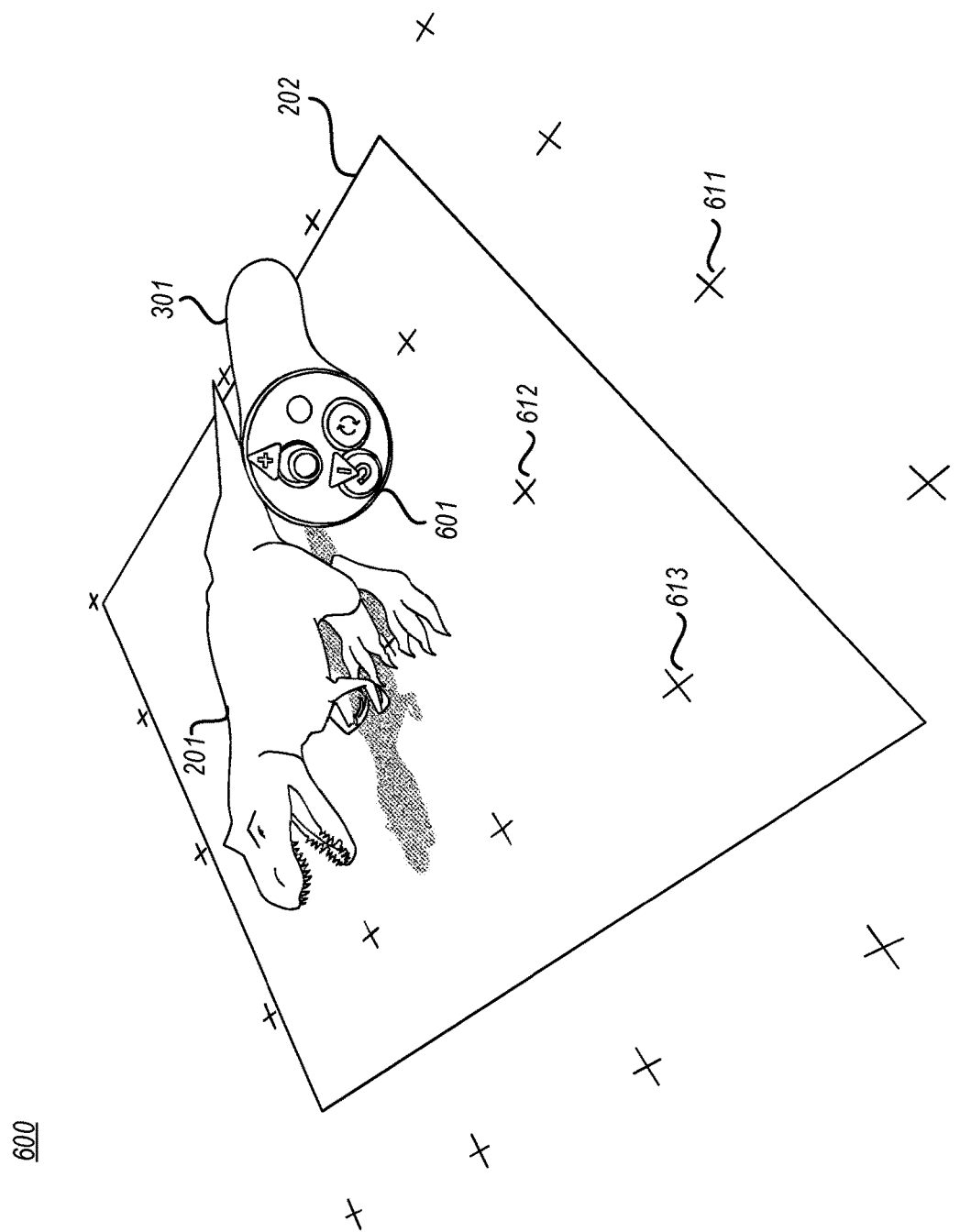

FIG. 6 illustrates a user interface 600 that is similar to the user interface 400 of FIG. 4, except after the user has selected a snap control 601 on the virtual controller 301. The selection of the snap control 601 is an example of the user-initiated snapping instruction of act 103 in FIG. 1. The resulting snapping is an example of act 104 of FIG. 4. Upon snapping, a surface grid appears on the target surface 202 visually emphasizing that snapping has completed onto the target surface that is coplanar with the surface grid. In this example, the surface grid is composed of a grid of crosshairs including, for instance, cross hairs 611, 612 and 613.

In one embodiment, when there are multiple sides of a bounding volume that are proximate a target surface, all corresponding rays might be visualized, and the user may issue an instruction (a "disambiguation instruction") as to which of those sides is to be snapped to the target surface. For instance, there may be multiple sides that are each within a particular distance of a potential target surface, whether to the same potential target surface, or to different potential target surfaces. Such a disambiguation instruction may be the same as, or distinct from, the user-initiated instruction to snap.

Once the virtual object is snapped on the target surface, the virtual object remains snapped to the target surface until a user selects to unsnap the virtual object from the target surface. For instance, the user might use virtual controller 301 to unsnap the virtual object 201 from the target surface 202. There may be a dedicated unsnap control on the virtual controller 301, or the user might perform a gesture with the virtual controller 301 to demonstrate an unsnap instruction.

While the virtual object remains snapped to the target surface, the virtual object may still be manipulated with a constraint that the virtual object remains in contact with the target surface (act 105 of FIG. 1). Thus, in the user interface 600 of FIG. 6, the user may use the virtual controller 301 to continue to move or manipulate the virtual object 201 while still snapped to the target surface 202.

For instance, the user may slide the virtual object 201 on the target surface 202. Incidentally, while sliding, it may be that the virtual object 201 comes into close proximity with another target surface. In that case, the method 100 may be repeated. For instance, to lodge an object into a corner defined by three different target surfaces, the method 100 may be performed three times. First, the computing system might perform the method 100 once to snap a first side of a bounding volume of the virtual object to a first target surface. Then, the user might slide the virtual object along the plane of the first target surface until a second surface of the bounding volume comes proximate to a second target surface. The user may then snap the second side of the bounding volume to the second target surface. Now, the virtual object is quite constrained. Nevertheless, the user may still slide the virtual object in a line defined by the first and second target surfaces until a third surface of the bounding volume comes proximate to the third target surface. The user may then snap the third side of the bounding volume to the third target surface, lodging the virtual object in the corner defined by the three target surfaces.

Figure 7:
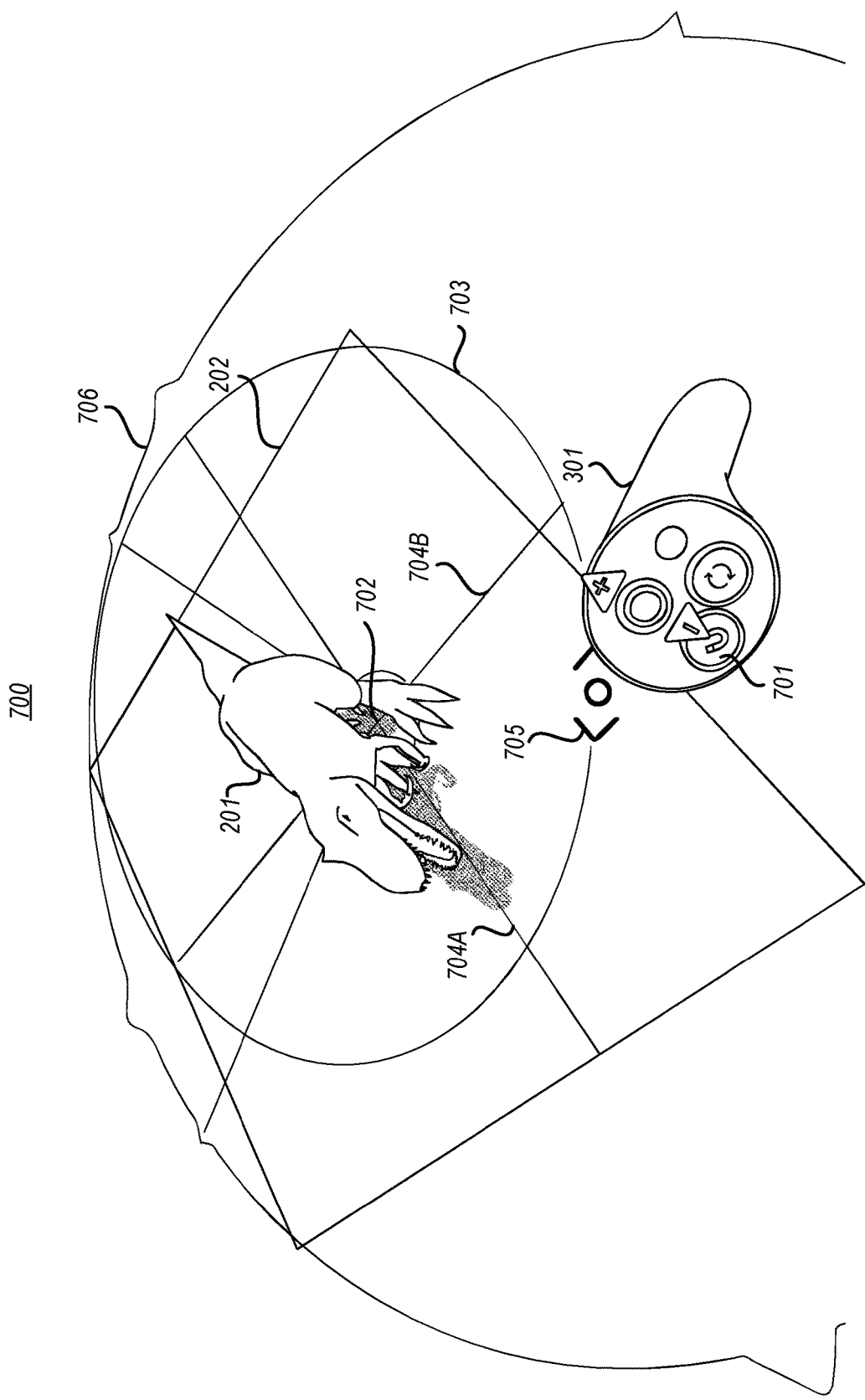

Another example of manipulation of the virtual object is rotation of the virtual object 201 on the target surface 202. FIG. 7 illustrates a user interface 700 that is similar to the user interface 600 of FIG. 6, except that now the user has selected a rotation control 701 on the virtual controller 301. This allows the user to rotate the virtual object 201 on the target surface 202 about the point 702 to which the proximate surface of the bounding volume was snapped to the target surface 202. This causes a rotation element 703 and orientation lines 704A and 704B to appear on the target surface 202. The user may then manipulate the virtual control 301 so as to move an angular slider 705 clockwise and counterclockwise so as to rotate the virtual object 201 about the point 702. An exterior circle 706 is also shown which permits the user to see when the orientation of the virtual object 201 (e.g., the length of the dinosaur) is rotated within a close angle to one of the orientation lines 704A and 704B.

Figure 8:
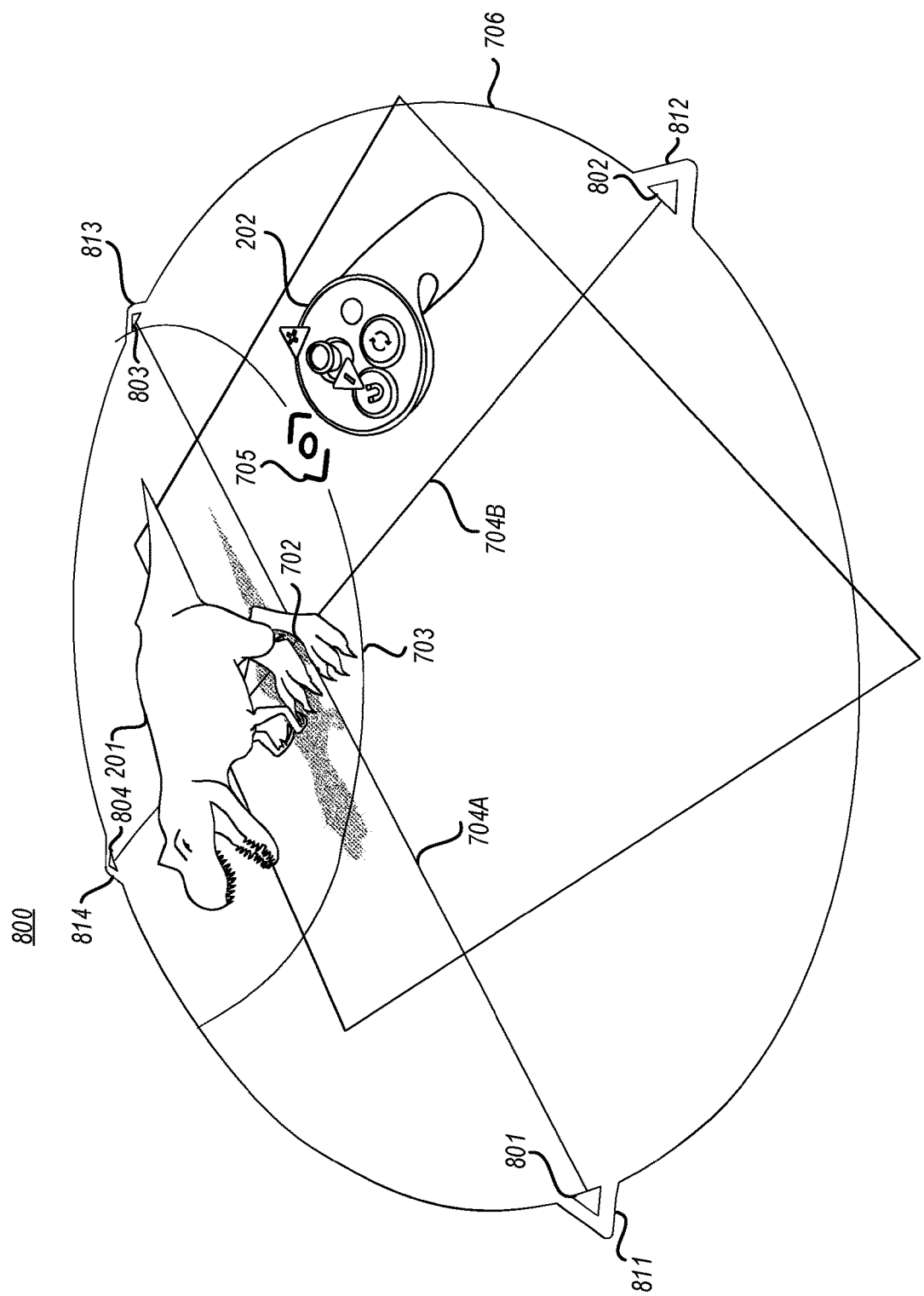

FIG. 8 is a user interface 800 that is similar to the user interface 700 of FIG. 7, except that now, the user has caused the rotation of the virtual object 201 to snap to the orientation lines 704A and 704B. This completed snapping is represented by the inner triangles 801 through 804 now appearing in the outer triangles 811 through 814, respectively, of the exterior circle 706. Thus, the user interface 800 may be provided with a control for snapping rotation of the virtual object 201 so as to align with edges of the target surface 202.

Figure 9:
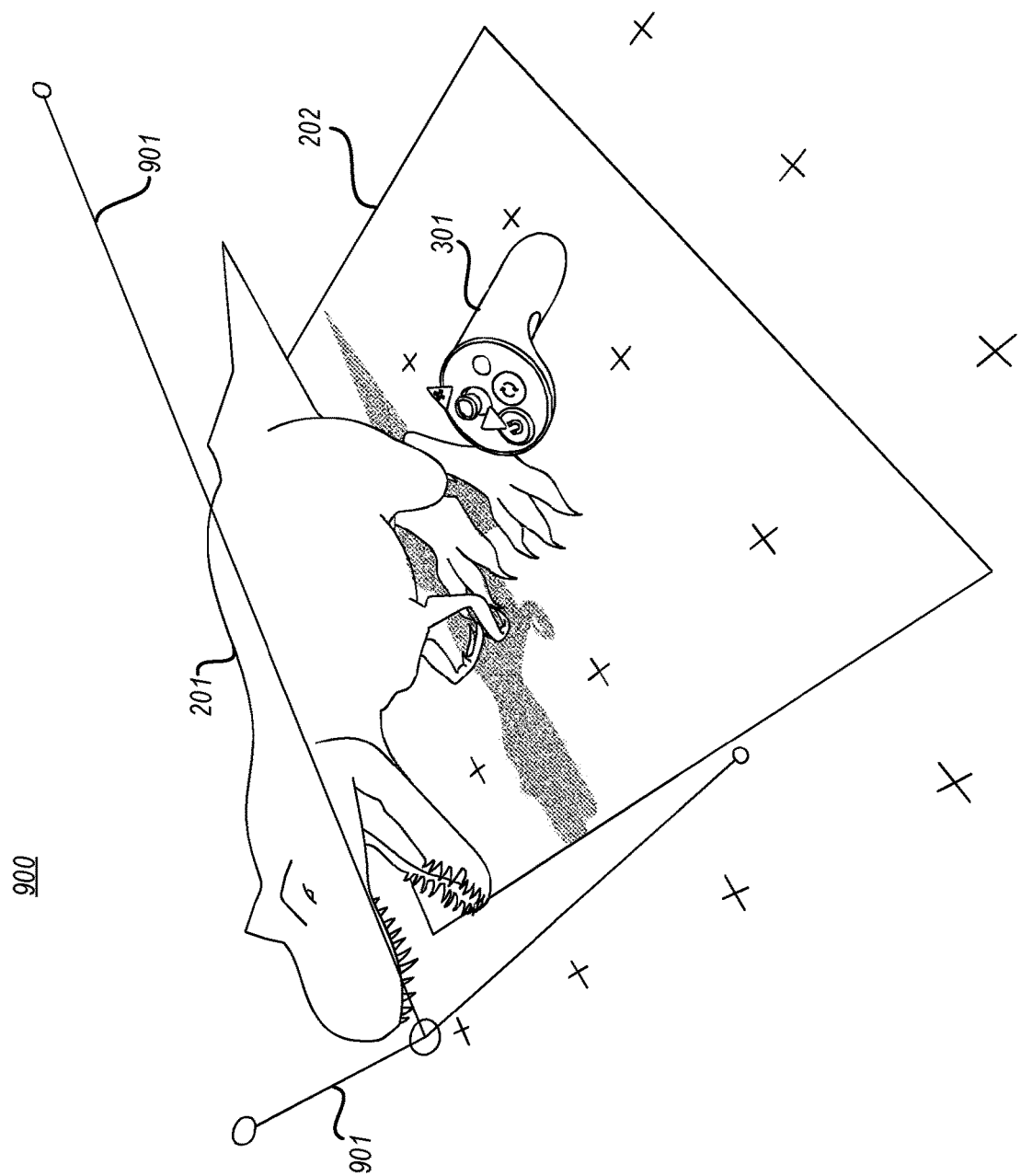
Figure 10:
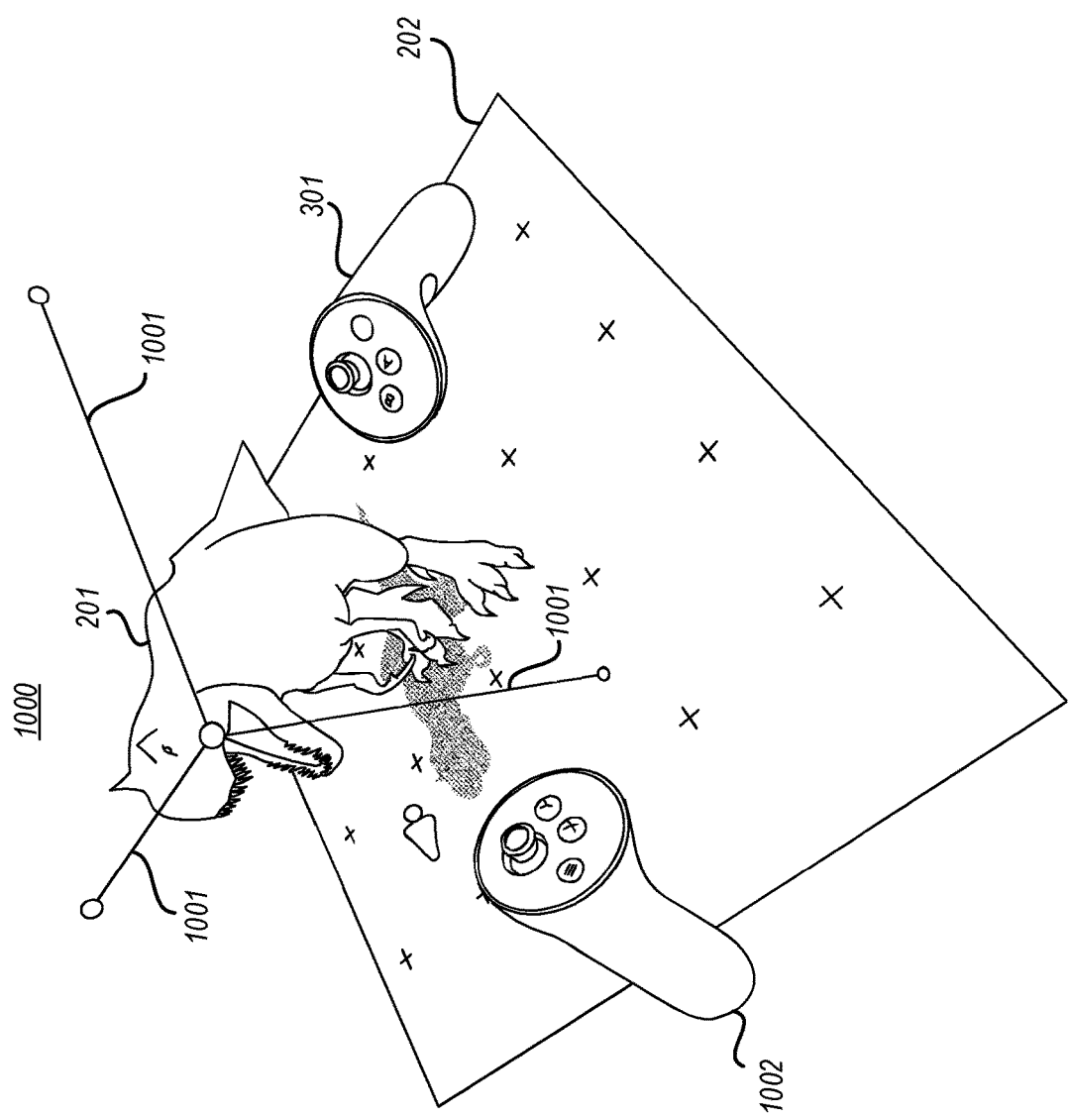

FIG. 9 is a user interface 900 that is similar to the user interface 800 of FIG. 8, except that the rotation controls have now disappeared, and instead the user is using a resize control 901 to resize the virtual object 201 while it is still snapped to the target surface 202. In the user interface 1000 of FIG. 10, the user is interfacing with a reproportion control 1001 to change the proportions (stretch or compress) the virtual object 201 while it is still snapped to the target surface 202. Here, the user may use two virtual controls 301 and 1002 for this purpose.

Figure 11:
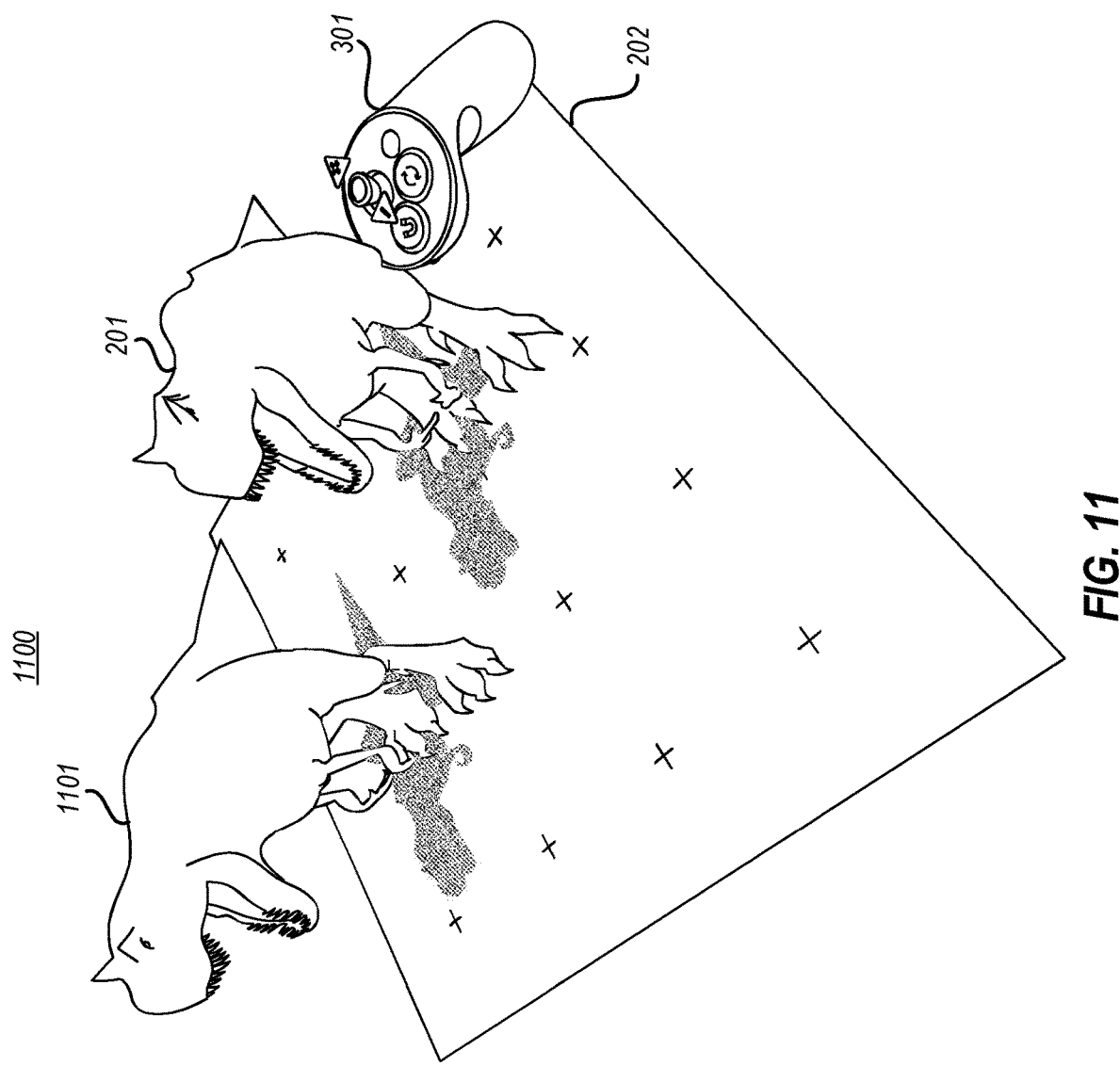

In the user interface 1100 of FIG. 11, the user has initiated a copy control to make a copy 1101 of the virtual object 201. Because the virtual object 201 was snapped to the target surface 202 at the time of the copy operation, the copied virtual object 202 likewise remains snapped to the target surface.

Figure 12:
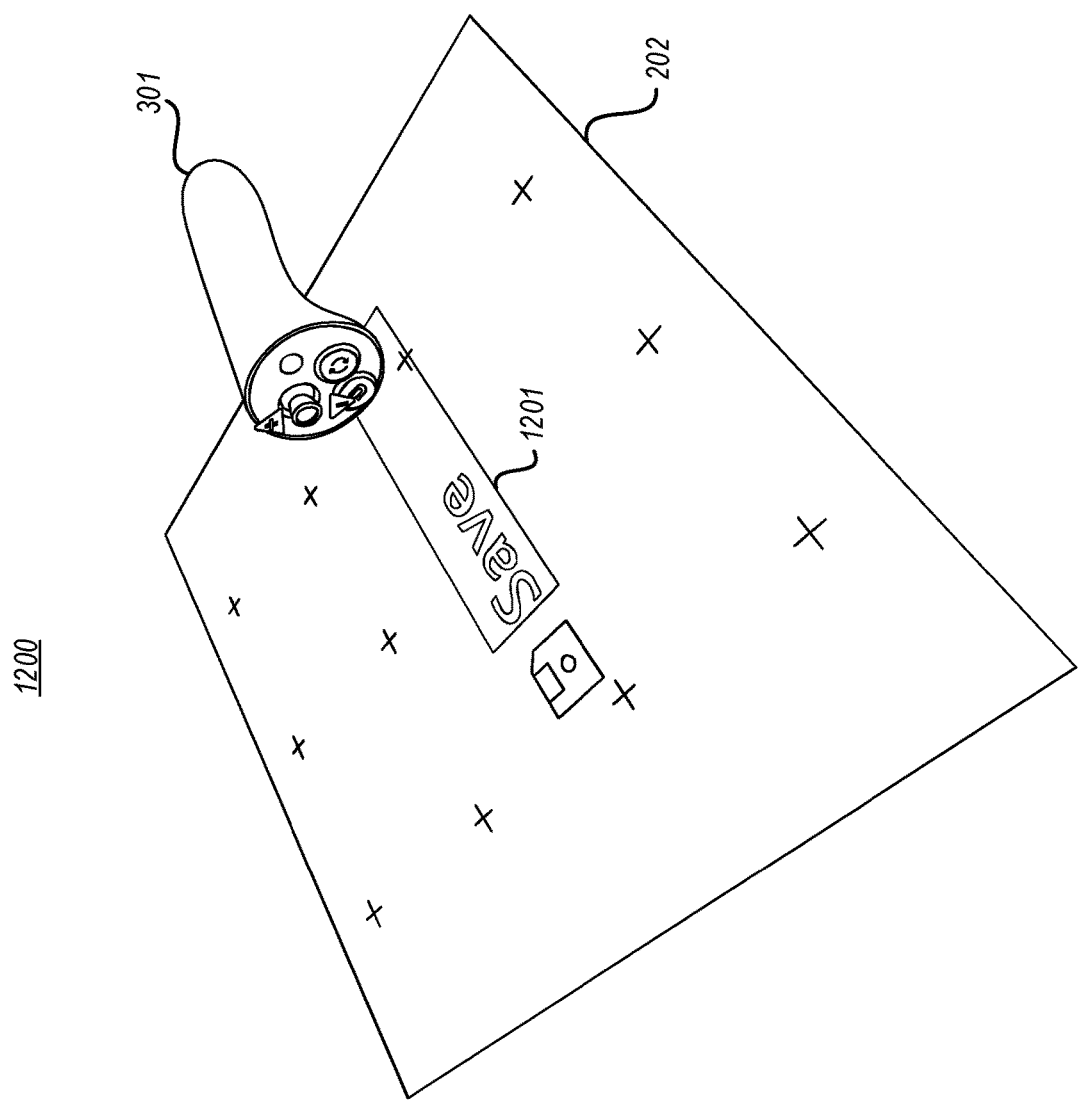
FIG. 12 shows a user interface in which the virtual object is a two-dimensional object, such as a picture or control (here, a "Save Control") that may be attached to the target surface.
Figure 13:
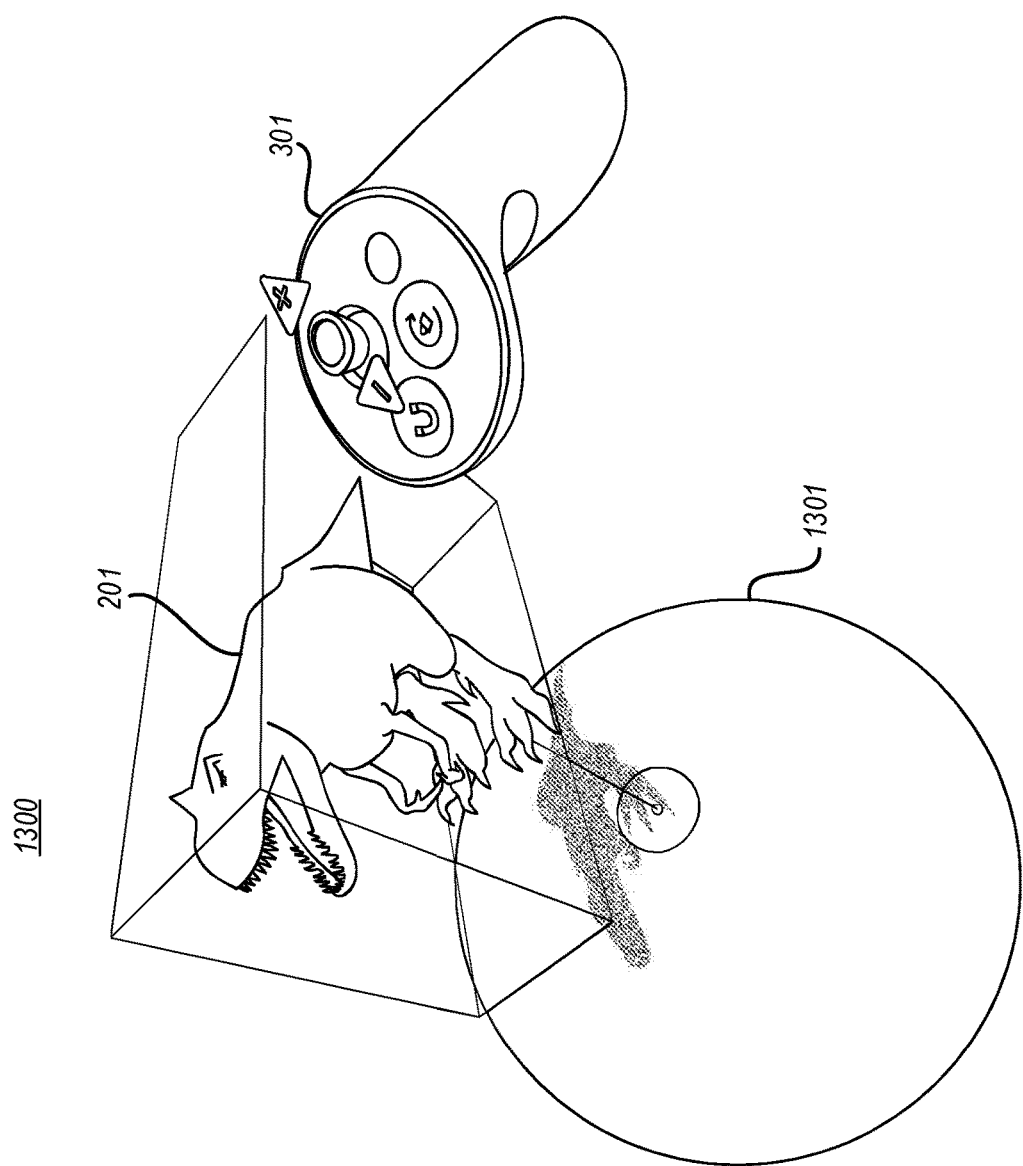
FIGS. 13 and 14 demonstrate a sequence of user interfaces showing that the target surface need not be planar, and here is a sphere.
Figure 14:
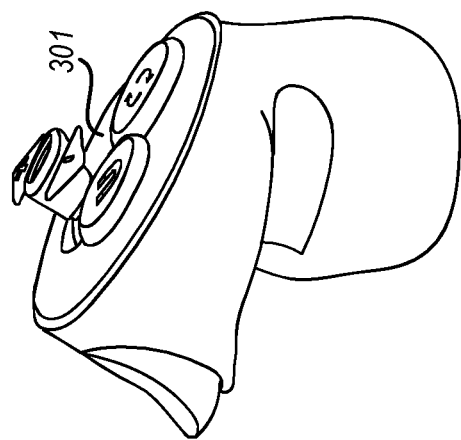
Figure 14:
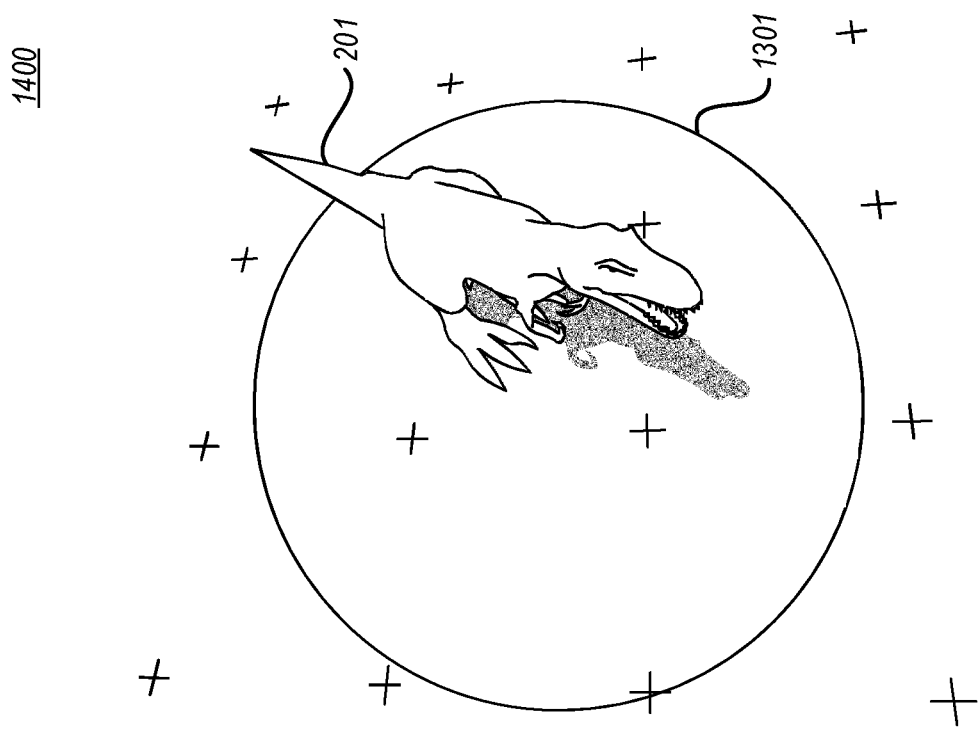

FIG. 12 is a user interface 1200 that demonstrates that the virtual object 1201 may be a two-dimensional object, such as a picture or control (here, a "Save Control") that may be attached to the target surface 202. FIGS. 13 and 14 demonstrate a sequence of user interfaces 1300 and 1400 showing that the target surface need not be planar. Here, the target surface 1301 is, in fact, a sphere. FIG. 13 shows the user interface 1300 prior to snapping. FIG. 14 shows the user interface 1400 after snapping.

Thus, the principles described herein allow for effective computer-assisted mechanisms to snap virtual objects into a virtual or augmented reality environment, allowing for efficient construction of such environments. The principles described herein may operate in the context of a computing system. For instance, the virtual or augmented reality environment is provided with the assistance of a computing system. Thus, a computing system will now be described with respect to FIG. 15.

Computing systems are now increasingly taking a wide variety of forms. Computing systems may, for example, be handheld devices, appliances, laptop computers, desktop computers, mainframes, distributed computing systems, datacenters, or even devices that have not conventionally been considered a computing system, such as wearables (e.g., glasses, watches, bands, and so forth). In this description and in the claims, the term "computing system" is defined broadly as including any device or system (or combination thereof) that includes at least one physical and tangible processor, and a physical and tangible memory capable of having thereon computer-executable instructions that may be executed by a processor. The memory may take any form and may depend on the nature and form of the computing system. A computing system may be distributed over a network environment and may include multiple constituent computing systems.

Figure 15:
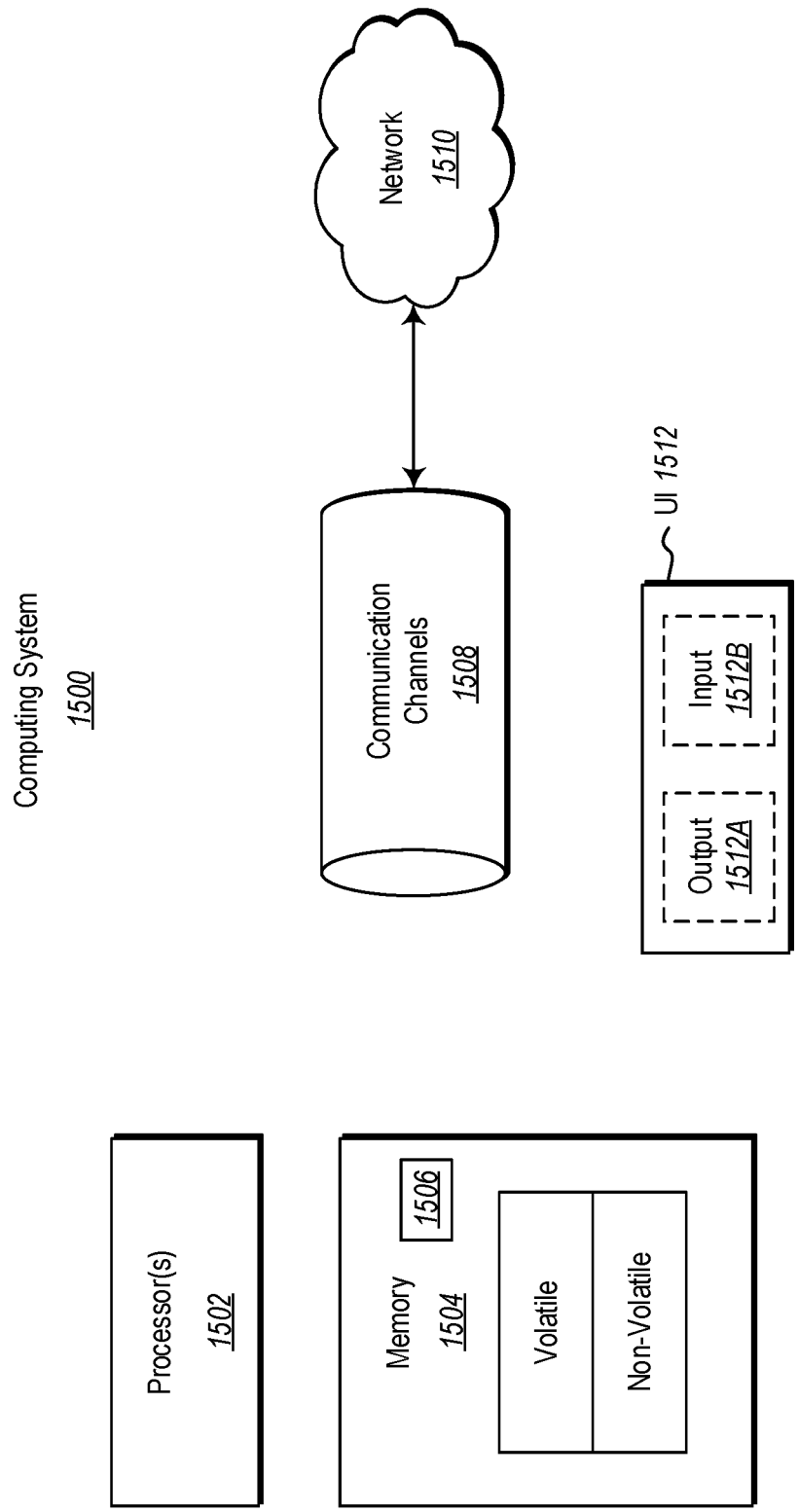
FIG. 15 illustrates an example computer system in which the principle described herein may be employed.

As illustrated in FIG. 15, in its most basic configuration, a computing system 1500 typically includes at least one hardware processing unit 1502 and memory 1504. The memory 1504 may be physical system memory, which may be volatile, non-volatile, or some combination of the two. The term "memory" may also be used herein to refer to non-volatile mass storage such as physical storage media. If the computing system is distributed, the processing, memory and/or storage capability may be distributed as well.

The computing system 1500 has thereon multiple structures often referred to as an "executable component". For instance, the memory 1504 of the computing system 1500 is illustrated as including executable component 1506. The term "executable component" is the name for a structure that is well understood to one of ordinary skill in the art in the field of computing as being a structure that can be software, hardware, or a combination thereof. For instance, when implemented in software, one of ordinary skill in the art would understand that the structure of an executable component may include software objects, routines, methods that may be executed on the computing system, whether such an executable component exists in the heap of a computing system, or whether the executable component exists on computer-readable storage media.

In such a case, one of ordinary skill in the art will recognize that the structure of the executable component exists on a computer-readable medium such that, when interpreted by one or more processors of a computing system (e.g., by a processor thread), the computing system is caused to perform a function. Such structure may be computer-readable directly by the processors (as is the case if the executable component were binary). Alternatively, the structure may be structured to be interpretable and/or compiled (whether in a single stage or in multiple stages) so as to generate such binary that is directly interpretable by the processors. Such an understanding of example structures of an executable component is well within the understanding of one of ordinary skill in the art of computing when using the term "executable component".

The term "executable component" is also well understood by one of ordinary skill as including structures that are implemented exclusively or near-exclusively in hardware, such as within a field programmable gate array (FPGA), an application specific integrated circuit (ASIC), or any other specialized circuit. Accordingly, the term "executable component" is a term for a structure that is well understood by those of ordinary skill in the art of computing, whether implemented in software, hardware, or a combination. In this description, the term "component" or "vertex" may also be used. As used in this description and in the case, this term (regardless of whether the term is modified with one or more modifiers) is also intended to be synonymous with the term "executable component" or be specific types of such an "executable component", and thus also have a structure that is well understood by those of ordinary skill in the art of computing.

In the description that follows, embodiments are described with reference to acts that are performed by one or more computing systems. If such acts are implemented in software, one or more processors (of the associated computing system that performs the act) direct the operation of the computing system in response to having executed computer-executable instructions that constitute an executable component. For example, such computer-executable instructions may be embodied on one or more computer-readable media that form a computer program product. An example of such an operation involves the manipulation of data.

The computer-executable instructions (and the manipulated data) may be stored in the memory 1504 of the computing system 1500. Computing system 1500 may also contain communication channels 1508 that allow the computing system 1500 to communicate with other computing systems over, for example, network 1510.

While not all computing systems require a user interface, in some embodiments, the computing system 1500 includes a user interface 1512 for use in interfacing with a user. The user interface 1512 may include output mechanisms 1512A as well as input mechanisms 1512B. The principles described herein are not limited to the precise output mechanisms 1512A or input mechanisms 1512B as such will depend on the nature of the device. However, output mechanisms 1512A might include, for instance, speakers, displays, tactile output, holograms, virtual reality, and so forth. Examples of input mechanisms 1512B might include, for instance, microphones, touchscreens, holograms, virtual reality, cameras, keyboards, mouse or other pointer input, sensors of any type, and so forth.

Embodiments described herein may comprise or utilize a special purpose or general-purpose computing system including computer hardware, such as, for example, one or more processors and system memory, as discussed in greater detail below. Embodiments described herein also include physical and other computer-readable media for carrying or storing computer-executable instructions and/or data structures. Such computer-readable media can be any available media that can be accessed by a general purpose or special purpose computing system. Computer-readable media that store computer-executable instructions are physical storage media. Computer-readable media that carry computer-executable instructions are transmission media. Thus, by way of example, and not limitation, embodiments can comprise at least two distinctly different kinds of computer-readable media: storage media and transmission media.

Computer-readable storage media include RAM, ROM, EEPROM, CD-ROM or other optical disk storage, magnetic disk storage or other magnetic storage devices, or any other physical and tangible storage medium which can be used to store desired program code means in the form of computer-executable instructions or data structures and which can be accessed by a general purpose or special purpose computing system.

A "network" is defined as one or more data links that enable the transport of electronic data between computing systems and/or components and/or other electronic devices. When information is transferred or provided over a network or another communications connection (either hardwired, wireless, or a combination of hardwired or wireless) to a computing system, the computing system properly views the connection as a transmission medium. Transmissions media can include a network and/or data links which can be used to carry desired program code means in the form of computer-executable instructions or data structures and which can be accessed by a general purpose or special purpose computing system. Combinations of the above should also be included within the scope of computer-readable media.

Further, upon reaching various computing system components, program code means in the form of computer-executable instructions or data structures can be transferred automatically from transmission media to storage media (or vice versa). For example, computer-executable instructions or data structures received over a network or data link can be buffered in RANI within a network interface component (e.g., a "NIC"), and then eventually transferred to computing system RANI and/or to less volatile storage media at a computing system. Thus, it should be understood that readable media can be included in computing system components that also (or even primarily) utilize transmission media.

Computer-executable instructions comprise, for example, instructions and data which, when executed at a processor, cause a general purpose computing system, special purpose computing system, or special purpose processing device to perform a certain function or group of functions. Alternatively, or in addition, the computer-executable instructions may configure the computing system to perform a certain function or group of functions. The computer executable instructions may be, for example, binaries or even instructions that undergo some translation (such as compilation) before direct execution by the processors, such as intermediate format instructions such as assembly language, or even source code.

Those skilled in the art will appreciate that the invention may be practiced in network computing environments with many types of computing system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, pagers, routers, switches, datacenters, wearables (such as glasses or watches) and the like. The invention may also be practiced in distributed system environments where local and remote computing systems, which are linked (either by hardwired data links, wireless data links, or by a combination of hardwired and wireless data links) through a network, both perform tasks. In a distributed system environment, program components may be located in both local and remote memory storage devices.

Those skilled in the art will also appreciate that the invention may be practiced in a cloud computing environment, which is supported by one or more datacenters or portions thereof. Cloud computing environments may be distributed, although this is not required. When distributed, cloud computing environments may be distributed internationally within an organization and/or have components possessed across multiple organizations.

In this description and the following claims, "cloud computing" is defined as a model for enabling on-demand network access to a shared pool of configurable computing resources (e.g., networks, servers, storage, applications, and services). The definition of "cloud computing" is not limited to any of the other numerous advantages that can be obtained from such a model when properly deployed.

For instance, cloud computing is currently employed in the marketplace so as to offer ubiquitous and convenient on-demand access to the shared pool of configurable computing resources. Furthermore, the shared pool of configurable computing resources can be rapidly provisioned via virtualization and released with low management effort or service provider interaction, and then scaled accordingly.

A cloud computing model can be composed of various characteristics such as on-demand, self-service, broad network access, resource pooling, rapid elasticity, measured service, and so forth. A cloud computing model may also come in the form of various application service models such as, for example, Software as a service ("SaaS"), Platform as a service ("PaaS"), and Infrastructure as a service ("IaaS"). The cloud computing model may also be deployed using different deployment models such as private cloud, community cloud, public cloud, hybrid cloud, and so forth. In this description and in the claims, a "cloud computing environment" is an environment in which cloud computing is employed.

Traditionally, identity management systems are often built on centralized authorities including, but not limited to, employer directories, government organizations, email services, certificate authorities, and/or domain name registries. On the other hand, decentralized identities are identities upon which authentication may be performed in a decentralized system. Examples of such decentralized systems include a distributed ledger in which the decentralized identity may be recorded. Another example of a decentralized system includes a peer-to-peer system in which authentication is performed within the peer-to-peer system, allowing computing systems within the peer-to-peer system to then take action based on the authentication.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A computing system comprising:
one or more processors; and
one or more computer-readable media having thereon computer-executable instructions that are executable by the one or more processors to cause the computing system to facilitate a virtual object contacting a target surface in a mixed-reality environment, and by at least configuring the computing system to perform the following:
detect a user-selection of the virtual object, the virtual object being associated with a plurality of qualified snapping surfaces;
detect that the virtual object has moved proximate a target surface by at least detecting that a portion of a most proximate qualified snapping surface associated with the virtual object has moved within a predetermined distance from a portion of the target surface;
while the virtual object remains proximate the target surface, detect a user-initiated snapping instruction; and
in response to the user-initiated snapping instruction, and in response to detecting that the portion of a most proximate qualified snapping surface of the plurality of qualified snapping surfaces associated with the virtual object has moved within a predetermined distance from a portion of the target surface, snap the virtual object to the target surface by snapping the most proximate qualified snapping surface associated with the virtual object to the target surface.

2. The computing system in accordance with claim 1, wherein when the virtual object has moved proximate the target surface, the target surface is visually emphasized to the user.

3. The computing system in accordance with claim 1, the virtual object being bound by a bounding volume having the plurality of qualified snapping surfaces associated with the virtual object, that moves with the virtual object, the snapping the most proximate qualified snapping surface associated with the virtual object to the target surface comprising snapping a most proximate qualified snapping surface of the bounding volume to the target surface.

4. The computing system in accordance with claim 3, the bounding volume being a box having six surfaces.

5. The computing system in accordance with claim 1, the portion of the target surface being visually emphasized to the user when the virtual object has moved proximate the target surface.

6. The computing system in accordance with claim 1, the snapping of the most proximate qualified snapping surface of the bounding volume to the target surface comprising snapping the portion of the proximate qualified snapping surface to the portion of the target surface.

7. The computing system in accordance with claim 1, wherein the plurality of qualified snapping surfaces comprises less than all of the plurality of surfaces of the bounding volume, such that one or more surfaces of the bounding volume are not qualified for snapping.

8. The computing system in accordance with claim 1, the target surface being a first target surface, the method further comprising:
detecting that the virtual object has also moved proximate a second target surface; and
while the virtual object remains proximate the first target surface and a second target surface, detecting a user-selection of the first target surface for snapping.

9. The computing system in accordance with claim 1, the virtual object being within a virtual reality environment, and the target surface being a virtual surface in the virtual reality environment.

10. The computing system in accordance with claim 1, the virtual object being a virtual object within a mixed reality environment, and the target surface being a real surface.

11. The computing system in accordance with claim 1, wherein after the virtual object is snapped to the target surface, the virtual object remains snapped to the target surface until a user selects to unsnap the virtual object from the target surface.

12. The computing system in accordance with claim 1, wherein after the virtual object is snapped to the target surface, and even absent a user instruct to unsnap the virtual object from the target surface, the virtual object may still be manipulated with a constraint that the virtual object remains in contact with the target surface.

13. The computing system in accordance with claim 12, wherein the manipulation comprises resizing, reproportioning or sliding the virtual object while the virtual object remains in contact with the target surface.

14. The computing system in accordance with claim 13, the target surface being a first target surface, the user-initiated snapping instruction being a first user-initiated snapping instruction, the manipulation comprising:
- detecting that the virtual object has moved proximate a second target surface;
- while the virtual object remains proximate the second target surface, detecting a second user-initiated snapping instruction; and
- in response to the second user-initiated snapping instruction, snapping the virtual object to the second target surface, such that the virtual object is snapped to both the first target surface and the second target surface.

15. The computing system in accordance with claim 12, wherein the manipulation comprises rotating the virtual object while the virtual object remains in contact with the target surface.

16. The computing system in accordance with claim 15, the method further comprising:
- providing a user interface for snapping the rotation of the virtual object so as to be aligned with edges of the target surface.

17. A method for a computing system facilitating a virtual object contacting a target surface in a mixed-reality environment, the method comprising:
- detecting a user-selection of the virtual object, the virtual object being associated with a plurality of qualified snapping surfaces;
- detecting that the virtual object has moved proximate a target surface by at least detecting that a portion of a most proximate qualified snapping surface associated with the virtual object has moved within a predetermined distance from a portion of the target surface;
- while the virtual object remains proximate the target surface, detecting a user-initiated snapping instruction; and
- in response to the user-initiated snapping instruction, snapping the virtual object to the target surface by snapping the most proximate qualified snapping surface associated with the virtual object to the target surface.

18. The method in accordance with claim 17, wherein after the virtual object is snapped to the target surface, and even absent a user instruct to unsnap the virtual object from the target surface, the virtual object may still be manipulated with a constraint that the virtual object remains in contact with the target surface.

19. The computing system in accordance with claim 17, the method further comprising:
- in response to the virtual object moving proximate a target surface, and before the virtual object is snapped to the target surface, visually emphasizing the target surface to the user by displaying an indicator of the target surface on the target surface that is distinct from, and concurrently displayed with, the virtual object.

20. The method of claim 19, wherein the indicator of the target surface is a different shape and a different size than the virtual object.

21. A computer program product comprising one or more computer-readable storage media having thereon computer-executable instructions that are executable by one or more processors of a computing system for facilitating a virtual object contacting a target surface in a mixed-reality environment, and by at least causing configuring the computing system to perform the following:
- detect a user-selection of the virtual object;
- detect that the virtual object has moved proximate a first target surface;
- while the virtual object remains proximate the first target surface, detect a first user-initiated snapping instruction;
- in response to the first user-initiated snapping instruction, snap the virtual object to the first target surface so as to position the virtual object in contact with the first target surface;
- detect that the virtual object has moved proximate a second target surface while still remaining in contact with the first target surface;
- while the virtual object remains proximate the second target surface and while the virtual object remains in contact with the first target surface, detecting a second user-initiated snapping instruction; and
- in response to the second user-initiated snapping instruction, snap the virtual object to the second target surface while still remaining in contact with the first target surface, and such that the virtual object is positioned in the mixed-reality environment in contact with both the first target surface and the second target surface.

* * * * *